United States Patent
Benjamin et al.

(10) Patent No.: US 9,529,168 B2
(45) Date of Patent: Dec. 27, 2016

(54) FIBER OPTIC RIBBON

(71) Applicant: Corning Optical Communicatons LLC, Hickory, NC (US)

(72) Inventors: Seldon David Benjamin, Painted Post, NY (US); David Wesley Chiasson, Edmonton (CA)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 55 days.

(21) Appl. No.: 14/327,855

(22) Filed: Jul. 10, 2014

(65) Prior Publication Data

US 2015/0030297 A1 Jan. 29, 2015

Related U.S. Application Data

(60) Provisional application No. 61/858,741, filed on Jul. 26, 2013.

(51) Int. Cl.
*G02B 6/44* (2006.01)
*G02B 6/02* (2006.01)

(52) U.S. Cl.
CPC ......... *G02B 6/4403* (2013.01); *G02B 6/02042* (2013.01); *G02B 6/02395* (2013.01); *G02B 6/443* (2013.01); *G02B 6/4429* (2013.01)

(58) Field of Classification Search
CPC ... G02B 1/105; G02B 6/02395; G02B 6/4403; G02B 6/443; G02B 6/4429; G02B 6/4401; G02B 6/02042; G02B 6/4486
See application file for complete search history.

(56) References Cited

U.S. PATENT DOCUMENTS

| 4,828,349 A | 5/1989 | Nakasuji .............. 350/96.33 |
| 4,930,860 A | 6/1990 | Tansey et al. ........ 950/96.23 |

(Continued)

FOREIGN PATENT DOCUMENTS

JP     59-217653 A     12/1984     ............ C03C 25/02

OTHER PUBLICATIONS

Patent Cooperation Treaty, International Search Report and Written Opinion for International Application No. PCT/US2014/047515, Mailing Date Nov. 6, 2014—12 pages.

*Primary Examiner* — Thomas A Hollweg
*Assistant Examiner* — Mary A El Shammaa
(74) *Attorney, Agent, or Firm* — William D. Doyle

(57) ABSTRACT

A fiber optic ribbon includes optical fibers, each including a core surrounded by cladding, and edge bonding rigidly connecting the optical fibers to one. The ribbon further includes a stress-isolation layer surrounding the optical fibers and edge bonding, and a hardened shell surrounding the stress-isolation layer. The edge bonding mitigates independent movement of the optical fibers relative to one another within the stress-isolation layer. At 25° Celsius and at sea level, the Young's modulus of elasticity of the hardened shell is, on average, at least twice that of the stress-isolation layer. Accordingly, the hardened shell mitigates damage to the stress-isolation layer from external sources of wear, the stress-isolation layer cushions the optical fibers relative to external sources of stress and provides some flexibility to the optical fibers within the hardened shell, and the edge bonding mitigates attenuation of the optical fibers associated with fiber-on-fiber loading internal to the stress-isolation layer.

10 Claims, 5 Drawing Sheets

(56) References Cited

U.S. PATENT DOCUMENTS

| | | | |
|---|---|---|---|
| 5,717,805 A | 2/1998 | Stulpin | 385/114 |
| 5,761,363 A | 6/1998 | Mills | 385/114 |
| 5,933,559 A * | 8/1999 | Petisce | C03C 25/10 385/106 |
| 8,041,168 B2 | 10/2011 | Overton | 385/114 |
| 2005/0244117 A1* | 11/2005 | Tanaka | G02B 6/4403 385/114 |
| 2006/0045443 A1 | 3/2006 | Blazer | 385/114 |
| 2007/0122093 A1* | 5/2007 | Chien | G02B 6/4482 385/114 |
| 2010/0296780 A1* | 11/2010 | Schiaffo | G02B 6/02395 385/114 |
| 2012/0099825 A1 | 4/2012 | Messer | 385/113 |
| 2013/0302003 A1* | 11/2013 | Bookbinder | G02B 6/4403 385/128 |
| 2014/0199037 A1 | 7/2014 | Hurley et al. | |

\* cited by examiner

FIBER OPTIC RIBBON

RELATED APPLICATIONS

This application claims the benefit of priority under 35 U.S.C. §119 of U.S. Provisional Application Ser. No. 61/858,741 filed on Jul. 26, 2013, the content of which is relied upon and incorporated herein by reference in its entirety.

BACKGROUND

The disclosure relates generally to optical signal or communication fibers and more particularly to optical communication or fiber ribbons. Optical fibers have seen increased use in a wide variety of electronics and telecommunications fields. Fiber optic ribbons may hold multiple optical fibers together in a group or array. The fiber optic ribbon includes a body formed from a material that holds the optical fibers together and/or that provides structure that assists in the handling and connecting of the optical fibers of the ribbon to various components or devices.

Optical fibers may include a glass core surrounded by a glass cladding. The cladding, in turn, may be surrounded by polymeric layers. Typically the polymeric layers include a stress-isolation or -absorption layer and then a harder outer shell layer. The polymeric layers tend to be rather thick in proportion to the core and cladding such that the polymeric layers may double the diameter of the optical fibers or more. Accordingly, fiber optic ribbons made with such optical fibers are wide relative to single optical fibers or glass portions thereof. The fiber optic ribbons require a corresponding large amount of matrix material to bind the optical fibers together, and may be cumbersome to connectorize in small form-factor connectors because the optical fibers may need to be removed from the ribbon matrix, stripped of their polymeric coatings, and then re-aligned when inserted in the connectors.

Some fiber optic ribbons may be substantially narrower, such as by removing the polymeric layers of individual fibers and then placing the fibers together in the ribbon. For example, the optical fibers in the ribbon may include glass and only a single polymeric coating, such as a hard shell; instead of the above-described dual-coating system. Some ribbons constructed with such optical fibers place a single, combined stress-isolation layer for the entire fiber optic ribbon around the individual fibers, which may then be surrounded by a hard outer shell for protection of the fiber optic ribbon.

However, removal of the individual polymeric layers of optical fibers, especially the stress-isolation layers, and then close placement of the optical fibers in a fiber optic ribbon may lead to increased attenuation of the optical fibers due to fiber-on-fiber contact and/or fiber-on-fiber loading within the fiber optic ribbon, such as when the ribbon is bending or twisting, especially if the stress isolation layer of the individual optical fibers is not present. Further, in some such fiber optic ribbons, removal of the polymeric coatings may obscure the identity of individual optical fibers in the fiber optic ribbons by making the optical fibers clear within the matrix and/or making the optical fibers indistinguishable from one another.

A need exists for (1) a fiber optic ribbon that is narrow and compact, reducing the volume of matrix material associated with conventional fiber optic ribbons and/or allowing for direct connectorization in small form-factor connectors; (2) narrow and compact fiber optic ribbons to be constructed in a manner that mitigates fiber-on-fiber contact and/or fiber-on-fiber loading within the fiber optic ribbon, such as when the ribbon is bending or twisting, to improve the performance of such fiber optic ribbons in terms of optical fiber attenuation; and/or (3) for differentiation of the individual optical fibers within the fiber optic ribbons, such as while maintaining the narrow geometry and/or attenuation mitigation attributes of the fiber optic ribbons.

SUMMARY

An embodiment of the disclosure relates to a fiber optic ribbon. The ribbon includes optical fibers, each optical fiber comprising a core surrounded by a cladding, and edge bonding rigidly connecting the optical fibers to one another in a side-by-side arrangement. The edge bonding mitigates independent movement of the optical fibers relative to one another within the fiber optic ribbon. The ribbon further includes a stress-isolation layer surrounding the optical fibers and edge bonding, and a hardened shell surrounding the optical fibers, the edge bonding, and the stress-isolation layer, the hardened shell defining an exterior of the fiber optic ribbon. At 25° Celsius and at sea level, the Young's modulus of elasticity of the hardened shell is, on average, at least twice that of the stress-isolation layer. Accordingly, the hardened shell mitigates damage to the stress-isolation layer from external sources of wear, the stress-isolation layer cushions the optical fibers relative to external sources of stress and provides at least some flexibility to the optical fibers within the hardened shell, and the edge bonding mitigates attenuation of the optical fibers associated with fiber-on-fiber loading internal to the fiber optic ribbon.

Another embodiment of the disclosure relates to a fiber optic ribbon. The fiber optic ribbon includes a ribbon body formed from polymeric material and defining an exterior of the fiber optic ribbon. The fiber optic ribbon further includes an array of optical fibers surrounded by both the polymeric material of the ribbon body. Each optical fiber includes an optical core surrounded by cladding, and the cladding is surrounded by a coating layer formed from a single contiguous layer of polymeric material. The coating layer has an inner surface contacting the cladding and an outer surface defining an exterior surface of the optical fibers. The coating layer is formed from a stress-isolating material that has a lesser modulus of elasticity than at least the portion of the polymeric material of the ribbon body defining the exterior of the fiber optic ribbon.

An additional embodiment of the disclosure relates to a fiber optic ribbon. The fiber optic ribbon includes a multi-layered ribbon body having an outer layer and an inner layer. The fiber optic ribbon includes an array of a plurality optical fibers, and the array is embedded in the material of the inner layer. The distance between optical cores of the optical fibers in the array is less than 150 μm.

An additional embodiment of the disclosure relates to a fiber optic ribbon including a first optical fiber and a second optical fiber. The fiber optic ribbon includes a body layer formed from a contiguous polymeric material that surrounds both the first optical fiber and the second optical fiber. The first optical fiber and the second optical fiber each include an optical core, a cladding layer surrounding the optical core, and a dual-coating layer surrounding the cladding layer. The dual-coating layer of each optical fiber includes an inner layer contacting the cladding layer of a first hard-coating material and an outer layer defining an exterior surface of the optical fiber of a second hard-coating material. The first hard-coating material of the first and second optical fibers is the same material, while the second hard-coating material of the first and second optical fibers differs between the first and second optical fibers. In some embodiments, the difference between second coating layers is in terms of color. Both layers of the dual-coating layer have a modulus of the elasticity that is greater than the first modulus, such as at least twice, and/or at least three times the first modulus.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Referring generally to the figures, various embodiments of an optical ribbon are shown. In general, the ribbon embodiments disclosed herein are configured to provide densely packed optical fibers within a ribbon body, and the ribbon body may be configured to provide various characteristics that may improve use of the optical ribbon. For example ribbon body embodiments discussed herein may provide stress-isolation properties. Ribbon body embodiments discussed herein may provide abrasion- and wear-resistance properties. Ribbon body embodiments discussed herein may also allow for desired ribbon bending or positioning within a cable structure while minimizing or reducing attenuation of optical signals and/or provide core to core alignment for the purposes of mass optical splicing/connectorization. In general the ribbons discussed herein include a ribbon body (e.g., a ribbon matrix) and at least two optical fibers embedded in the ribbon body. Through the use of a new and inventive ribbon and/or fiber structure, fiber optic ribbons disclosed herein may be substantially smaller and more compact and/or have better performance than many conventional fiber optic ribbons.

Figure 1:
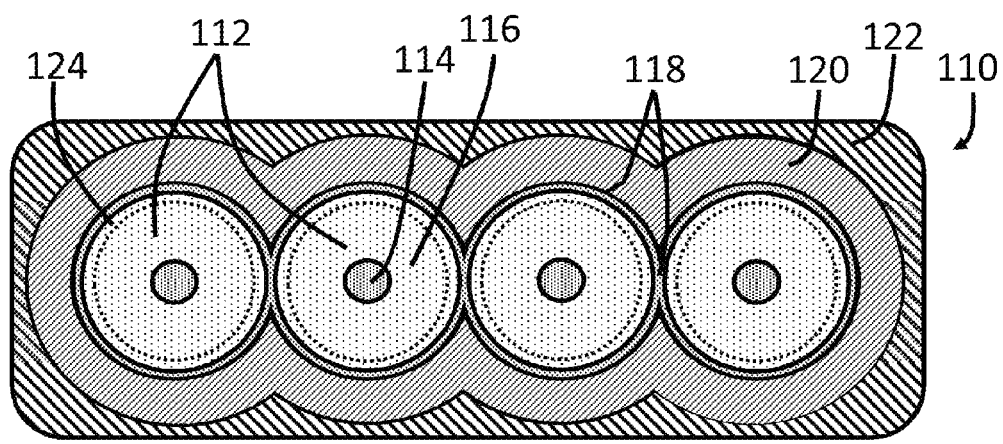
FIG. 1 is a cross-sectional view of a fiber optic ribbon according to an exemplary embodiment.

Referring specifically to FIG. 1, an embodiment of the disclosure relates to a fiber optic ribbon 110. The ribbon 110 includes optical fibers 112, each optical fiber 112 including a glass core 114 surrounded by a glass cladding 116, and edge bonding 118 rigidly connecting the optical fibers 112 to one another in a side-by-side arrangement. The edge bonding 118 mitigates independent movement of the optical fibers 112 relative to one another within the fiber optic ribbon 110. According to an exemplary embodiment, the ribbon 110 further includes a stress-isolation layer 120 surrounding the optical fibers 112 and edge bonding 118, and a hardened shell 122 surrounding the optical fibers 122, the edge bonding 118, and the stress-isolation layer 120, the hardened shell 122 defining an exterior of the fiber optic ribbon 110.

According to an exemplary embodiment, at 25° Celsius and at sea level, the Young's modulus of elasticity of the hardened shell 122 is, on average, at least twice that of the stress-isolation layer 120. Accordingly, the hardened shell 122 mitigates damage to the stress-isolation layer 122 from external sources of wear, such as abrasive elements within a cable. The stress-isolation layer 120 cushions the optical fibers 112 relative to external sources of stress, such as a kinked or pinched jacket of a cable 150. The stress-isolation layer 120 further provides at least some flexibility to the optical fibers 112 within the hardened shell 122.

The edge bonding 118 mitigates attenuation of the optical fibers 112 associated with fiber-on-fiber loading internal to the fiber optic ribbon 110 by limiting the ability of the optical fibers 112 to move relative to one another and interact with one another within the ribbon 110. According to an exemplary embodiment, the edge bonding 118 is harder than the stress-isolation layer 120. For example, in some embodiments, at 25° Celsius and at sea level, the Young's modulus of elasticity of the edge bonding 118 is, on average, at least twice that of the stress-isolation layer 120.

Figure 6:
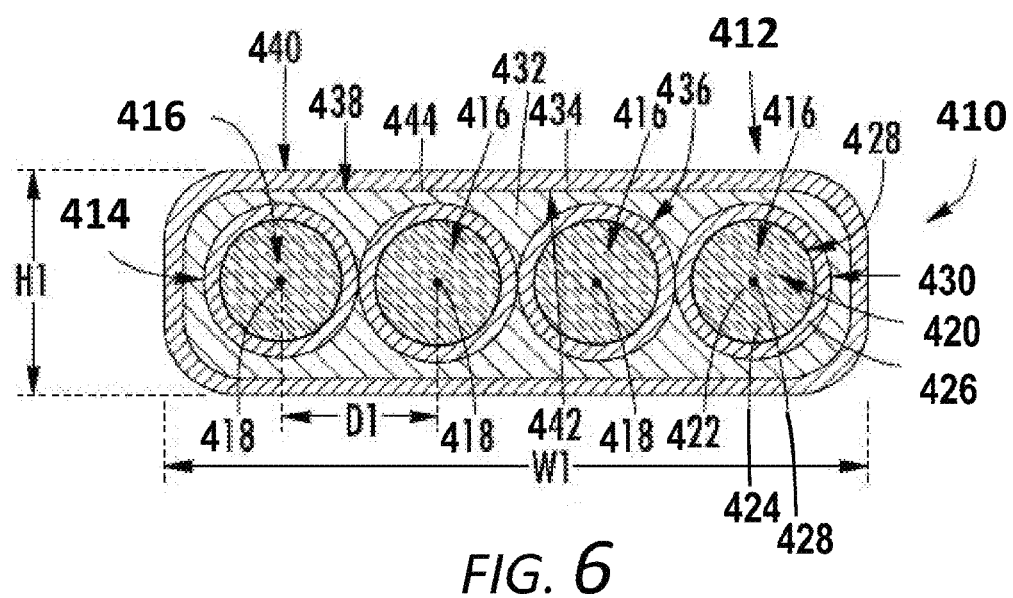
FIG. 6 is a cross-sectional view of the fiber optic ribbon of FIG. 5 according to an exemplary embodiment.
Figure 8:
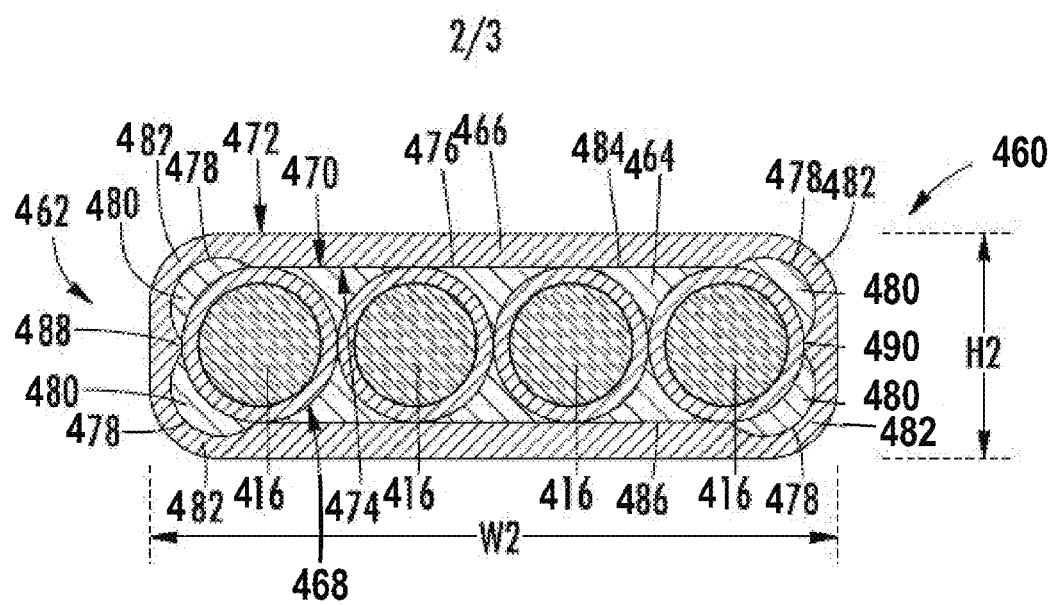
FIG. 8 is a cross-sectional view of the fiber optic ribbon of FIG. 7 according to an exemplary embodiment.

According to an exemplary embodiment, the edge bonding 118 is only a particularly small portion of the overall fiber optic ribbon 110. For example, in some embodiments, the edge bonding 118 is less than 10% of the fiber optic ribbon 110 in terms of volume, such as less than 6%, 5%, or even 4% of the fiber optic ribbon 110 in terms of volume. According to an exemplary embodiment, the edge bonding 118 substantially conforms to the shape of the optical fibers bonded together thereby, such as forming interstices between adjoining fibers. The stress-isolation layer 120 may similarly substantially conform to the shape of the optical fibers 112, as shown in FIG. 1, or may be otherwise shape, as shown in FIGS. 6 and 8.

In some embodiments, the edge bonding 118 is single layer of isotropic material, tightly encompassing the optical fibers 112 connected thereby. According to an exemplary embodiment, the edge bonding 118 circumferentially surrounds each of the optical fibers 112, such as forming a continuous, closed-loop surrounding each of the optical fibers, as shown in FIG. 1. The thickness of the loop may vary, such as being thicker between adjoining fibers. However, according to an exemplary embodiment, the edge bonding 118 extends no more than 50 micrometers, on average, from the closest optical fiber 112 of the optical fibers 112 connected by the edge bonding 118, such as no more than 20 micrometers, on average, from the closest optical fiber of the optical fibers connected thereby.

In contrast to the optical fibers of many conventional fiber optic ribbons, the optical fibers 112 of the embodiments discussed herein may have a small cross-section achieved by limiting the thickness of a polymeric coating that defines the exterior of the optical fibers 112. For example, in embodiments discussed herein, the optical fiber 112 may have a dual-layer outer polymeric coating 124 formed from material(s) that have a high modulus of elasticity that provides protection for the material of the optical fiber 112 interior thereto, such as protection of glass cladding 116 from abrasion and other forms of wear. Further, in some embodiments, the outermost layer of the polymeric coating 124 is colored to provide unique identification of the optical fiber 112 within the ribbon 110.

The dual-layer coating 124 is particularly thin, as further discussed below with regard to the fibers 416, and may provide only minimal protection needed to prevent fiber cladding 116 damage for transportation of a reel of the optical fiber 112 from one location to another location. Because of the limited thickness of the dual-layer coating 124 and the incorporation of low-modulus stress isolating material 120 into the ribbon 110, instead of into the polymeric coating(s) of each optical fiber 112, embodiments discussed herein provide particularly densely packed optical fibers 112 within a ribbon 110 that acts to isolate the optical fibers 112 from localized or other stresses that may be experienced by the ribbon from external and internal sources.

Figure 2:
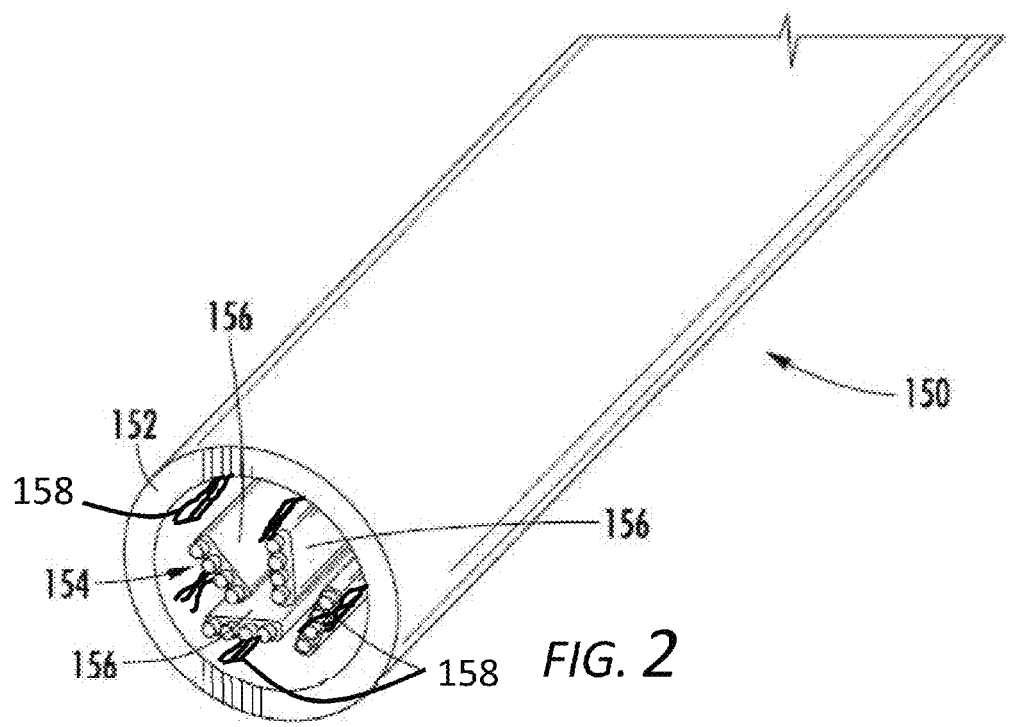
FIG. 2 is a perspective view of an optical fiber cable supporting multiple fiber optic ribbons, such as a fiber optic ribbon of FIG. 1, according to an exemplary embodiment.

Referring to FIG. 2, a fiber optic cable 150 is shown according to an exemplary embodiment. Fiber optic cable 150 includes a jacket 152 that has an inner surface defining a lumen 154 or cavity. One or more fiber optic ribbons 156 are located within lumen 154 (e.g., cavity, pathway, conduit). For example, a stack of a plurality of fiber optic ribbons 156 may be so located. Ribbons 156 may be any combination of ribbons disclosed herein, such as a plurality of ribbons 110 and/or other ribbons disclosed herein, and may have different numbers of optical fibers therein, such as four four-fiber ribbons and two eight-fiber ribbons. U.S. application Ser. No. 13/743,852 filed Jan. 17, 2013, entitled Fiber Optic Ribbon Cable, is incorporated by reference herein in its entirety.

In one embodiment, cable 150 may include strengthening elements 158, such as fiberglass and/or Kevlar strands or yarns, that provide tensile strength to cable 150 positioned around the ribbons 156 and/or between the ribbons 156 and the jacket 152. As shown in FIG. 2, because of the compact cross-sectional dimensions of ribbons 156 as discussed herein, in some embodiments space within lumen 154 allows ribbons 156 to rotate and realign within lumen 154 as cable 150 is bent and positioned as needed. This rotation and realignment within lumen 154 decrease forces experienced by the optical fibers of ribbons 156 as cable 150 is bent and positioned, which limits signal attenuation within the fibers 112.

In other embodiments, the jacket 156 and lumen 154 may be correspondingly reduced in dimension to provide a particularly narrow fiber optic cable 150, such as having an outer maximum dimension (e.g., diameter, width) of 8 mm or less, such as 5 mm or less, which is a particularly small fiber optic cable, and which is especially small for a fiber optic cable 150 carrying one or more fiber optic ribbons 110, such as supporting a total of at least four optical fibers 112, at least eight, or at least sixteen in the fiber optic cable 150. According to an exemplary embodiment, the fiber optic cable 150 may have an optical density of at least one optical fiber 112 per every twenty square millimeters of cross-sectional area of the cable 150, such at least one optical fiber 112 as per every ten square millimeters and/or at least one optical fiber 112 as per every five square millimeters. For example, a cable 150 having a cross-sectional area of no more than 80 mm$^2$, defined by the outside perimeter of the cable 150 in cross-section, has at least 16 optical fibers, such as at least 16 optical fibers, which provides for an especially dense fiber optic cable 150, and which may be especially useful in environments where space is at a premium, such as data centers.

Figure 3:
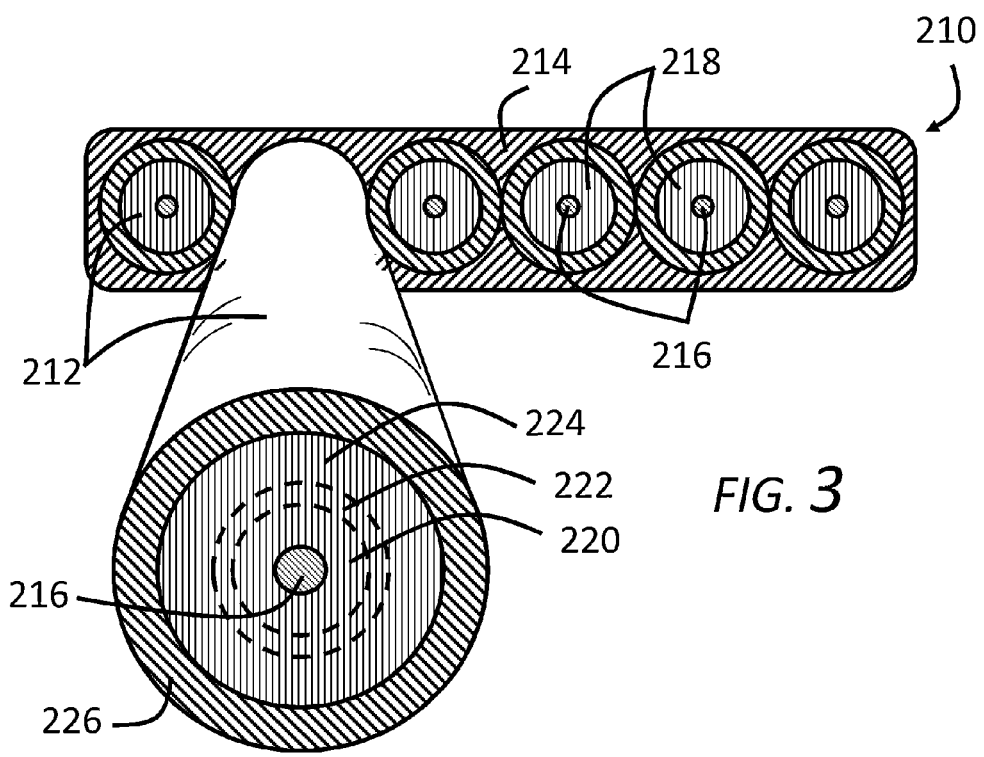
FIG. 3 is a perspective view of a fiber optic ribbon with an optical fiber extending forward therefrom, according to another exemplary embodiment.

Referring now to FIG. 3, a fiber optic ribbon 210, which may be used with a fiber optic cable similar to the fiber optic cable 150 and other embodiments, includes a plurality of optical fibers 212 arranged side-by-side with one another and coupled to one another in a common matrix material 214, such as a cross-linked and/or cured resin, thermoset material, acrylate material, thermoplastic material, or other matrix. According to an exemplary embodiment, the optical fibers are glass optical fibers, having a glass core 216 and a glass cladding 218, and may further include one or more polymeric coatings surrounding the glass cladding 218, such as those discussed above with regard to the optical fibers 112.

The optical fibers 112 and/or the optical fibers 212 of the ribbon 210 may be bend insensitive optical fibers 212, in some embodiments. In some such embodiments, the cladding 218 may include a plurality of annular layers 220, 222, 224 or sections. In some embodiments, at least two of the annular sections 222, 224 have different refractive indices from one another, such as an up-doped layer 222, for trapping light escaping from the core 216 when the fiber bends, and an adjoining layer(s) 220, 224 (e.g., exterior and/or interior layer) of pure silica or other material having a lower refractive index than the up-doped layer 222 and/or the core 216. In other embodiments, the annular sections 222, 224 include a down-doped layer.

As shown in FIG. 3, in contrast to the dual-coatings 124, 426 of the optical fibers 112, 416 (discussed below), the coating 226 of the optical fibers 212 in the ribbon 210 of FIG. 3 includes a single, isotropic, and uniform polymeric coating 226 surrounding and contacting the cladding 218. In further contrast to the dual-coatings, the polymeric coating 226 is a soft, stress-isolation layer, and may have a modulus similar to the layer 432 of the ribbon 410 in FIG. 6, discussed below. Further, the stress-isolation coating 226 on the optical fibers 212 may be substantially thicker than the hard dual-coatings 124, 426 of FIGS. 1 and 6, such as at least twice the thickness of coating 426 as discussed below, such as at least three times the thickness, range, ratio etc. of the layer 426. The matrix 214 of the ribbon in FIG. 3 may only include a single, uniform, isotropic matrix material, which is a hard coating, with properties similar to the coating of layer 434 in FIG. 6, discussed below. As such the stress isolation layer 226 of the fibers 212 works with the hard matrix 214 to protect the optical fibers from wear and stress-related attenuation.

With at least some embodiments associated with FIG. 3, the stress-isolation coating 226 may additionally serve to provide limited protection to the optical fiber 212, following manufacture of the fiber 212 and prior to and during manufacture of the ribbon 210. As such, the stress-isolation coating 226 is sufficient for in-factory handling by professional optical fiber technicians and specialized equipment, but may not be configured for wear and tear associated with handing and usage of standard optical fibers outside of a factory. The ribbons 110 and 210 may have dimensions of the ribbon 410 disclosed below, or may be slightly thinner and narrower, such as having dimensions that are 90% of the ranges, quantities, and ratios disclosed below for ribbon 410.

According to an exemplary embodiment, the coating 226 of one of the optical fibers 212 of the ribbon 210 is colored or dyed, and is a color that is visibly different than at least one other optical fiber 212 in the ribbon 210. The color or dye is integrated with the coating 226 of the fiber 212, but may also be integrated with one of the layers of the dual-coating 426 of the fiber 416 in FIG. 6, or in the coating of individual fibers of any of the other embodiments disclosed herein. In some embodiments, the colored optical fiber is on an end or edge of the array of optical fibers in the ribbon 210, and other fibers 212 of the ribbon 210 may not be colored or colored different from one another.

In other embodiments, each of the fibers 212 of the ribbon 210 has a distinctive color that is different than any other fiber in the ribbon 210. For example, in some contemplated embodiments, the coating 226 (FIG. 3) or coating 426 (FIG. 6) on each optical fiber 212, 416 is a colored-coating layer and also provides limited scratch protection for the optical fiber 212, 416. In some contemplated methods of manufacturing the ribbons disclosed herein, the color-coating layer 226, 426 may be applied "on the draw," while the glass core and cladding of the optical fibers 212, 416 are manufactured. Further, the matrix materials 214, 432, 434 may be selected to be at least partially translucent so that the color(s) can be discerned and distinguished from outside of the ribbon 210, 410.

Figure 4:
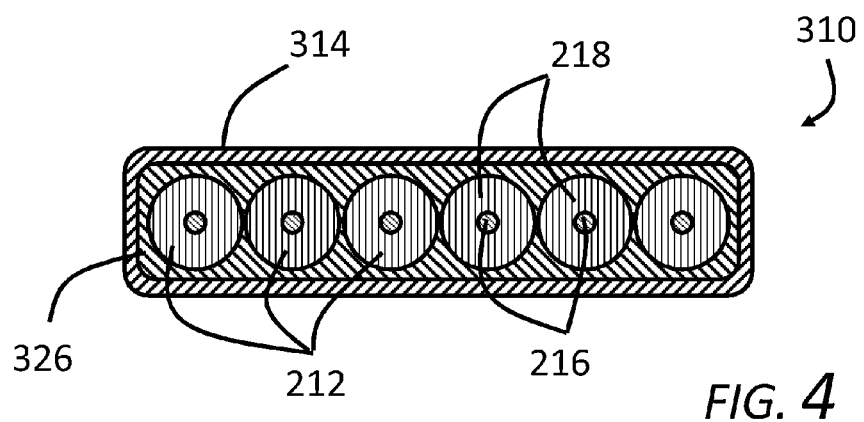
FIG. 4 is a cross-sectional view of the fiber optic ribbon according to yet another exemplary embodiment.

Referring now to FIG. 4, a ribbon 310, which may be used with a cable similar to cables discussed above, such as the cable 150, includes a plurality of optical fibers 212 arranged side-by-side with one another and coupled to one another in a common matrix material(s). The optical fibers 212 are glass optical fibers, having a glass core 216 and a glass cladding 218, and may be bend insensitive optical fibers 212, in some embodiments. The fibers 212 are embedded in a matrix material that includes both a stress-isolation layer 326 and a wear-resistant layer 314 as described herein with regard to embodiments associated with FIG. 6 among others. One edge or side of the ribbon 310 may be dyed or otherwise marked to indicate the orientation of the ribbon 310.

The ribbon of FIG. 4 is similar to the ribbons of FIGS. 1, 3, and 6, but without a discrete polymeric coating 124, 226, 426 on the individual fibers 112, 212, 416. For example, the ribbon 310 may be manufactured "on the draw," from optical fibers that are directly coming from a draw tower that is forming the optical fibers, where the optical fibers are not cut from the draw prior to ribboning, such that the optical fibers only have one free end during at least a portion of the ribbon manufacturing. In some such embodiments, the optical fibers 212 may not be manhandled, wound on a reel, or transported to a separate ribbon manufacturing facility prior to being integrated with the ribbon 310.

Accordingly, the ribbon 310 may be particularly efficient in size and materials, with the glass cladding 218 of each optical fiber 212 in a common polymeric matrix, and the glass cladding 218 of each optical fiber 212 adjacent to (e.g., touching, or within manufacturing tolerances of contacting, such as, on average, less than 50 micrometers, 30 micrometers, or even 20 micrometers therebetween) the cladding 218 of at least one other optical fiber 212 in the ribbon 310. As shown in FIG. 4, and as may be the case with the other embodiments disclosed herein, most of the volume of the ribbon 310 is glass of the optical fibers 212 (glass cores 216 and glass claddings 218), such as at least 55% by volume, or even 60% by volume, thereby forming a particularly compact and efficient ribbon 310, where the rest of the ribbon 310 (or other embodiments) may consist of polymers (matrix, coatings, and ink).

In some embodiments, the optical fibers 212 are bound to one another via edge bonding, as disclosed with regard to the ribbon 110, as shown in FIG. 1. For example, in some manufacturing processes, the optical fibers are edge bonded on the draw with a thin, hard coating of UV curable material, such as the material used for the wear-resistant layer 314 or a material with properties similar thereto. The edge-bonded array of optical fibers 212 may then, in some manufacturing methods, be wound on a reel and sold 'as is' to fiber optic ribbon manufacturers that may then add additional layers to the ribbon, such as the stress isolation layer 326 and the hard shell 314. The edge bonding may have dimensions similar to the dual-layer coating 326 of FIG. 6, discussed below, except where adjoining optical fibers 212 are bonded to one another by the edge bonding (see edge bonding 118 as shown in FIG. 1). In some contemplated embodiments, at least one fiber 212 of the ribbon 310 is color, such as colored on the draw, and the at least one fiber 212 is located on an end of the array of optical fibers 212 in the ribbon 310, such as two colored optical fibers 212 in the ribbon 310 on opposite sides of the array of optical fibers 212.

Figure 5:
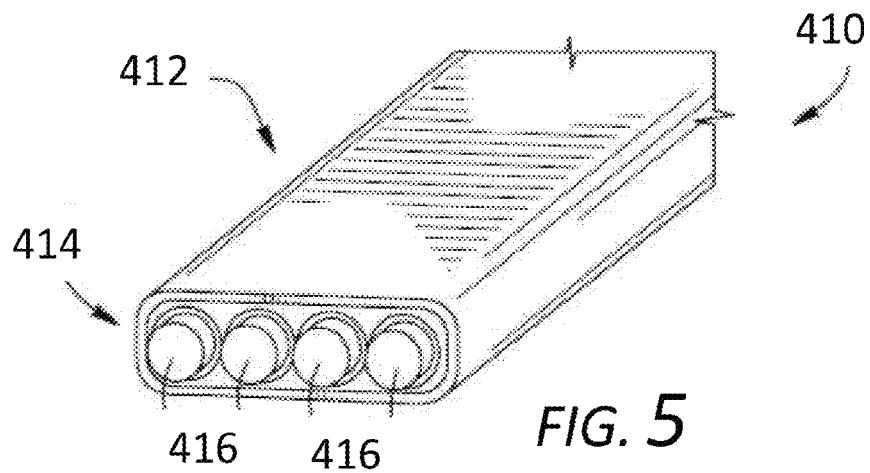
FIG. 5 is a perspective view of a fiber optic ribbon according to another exemplary embodiment.

Referring now to FIG. 5 and FIG. 6, a fiber optic ribbon, shown as fiber optic ribbon 410, is shown according to an exemplary embodiment. Ribbon 410 includes a ribbon body, shown as ribbon matrix 412 (e.g., binding material), and also includes an array 414 of a plurality of optical fibers, shown as optical fibers 416. Optical fibers 416 are surrounded by and embedded in the material of ribbon matrix 412. In the embodiment shown, array 414 is a parallel array of optical fibers in which the center axes 418 of each fiber (the axis of each optical fiber 416 perpendicular to the cross-section shown in FIG. 6) are substantially parallel to each other. In other embodiments, the optical fibers may be arranged in non-parallel arrays within ribbon body 412 (e.g., two-by-two arrays, staggered arrays, etc.), such as with each array establishing a consistent core to core spacing along the length of the ribbon, and from ribbon to ribbon, such as uniform spacing within a tolerance of 25% of the widest distance apart.

In the embodiment shown, each optical fiber 416 in array 414 only differs structurally from the other optical fibers 416, if at all, in terms of the outermost layer thereof (e.g., thin, hard color layer). Optical fibers 416 include a central portion 420 that includes an optically transmitting optical core 422 or cores 422 and a cladding layer 424 surrounding and adjoining the core 422 or cores 422. In some embodiments, the optical fibers 416 also each include a coating 426 exterior to the cladding layer 424. The optical core 422 is formed from a material that transmits light, such as up-doped silica or pure silica. The cladding layer 424, surrounding the core 422, is also formed from a material that transmits light, such as silica with up- or down-doped annular layers therein, but has a different refractive index than the core 422, such as a net lower refractive index than the optical core 422, whereby the optical fiber 416 acts as a waveguide that retains a light signal within optical core 422.

According to an exemplary embodiment, dual-coating 426 surrounds both optical core 422 and cladding layer 424. In particular, coating 426 has an inner layer 428 that contacts and is bonded to the outer surface of cladding 424. The inner layer 428 may be uniform among all optical fibers 416 of the ribbon 410. In some such embodiments, dual-coating 426 also has an outer layer 430 that defines the outer surface (e.g., exterior) of each optical fiber 416. The outer layer 430 may differ between one or more of the optical fibers 416 of the ribbon, such as in terms of color, having a difference of at least 3 in hue, value, and/or chroma on the Munsell scale to provide clear visual differentiation. The dual-coating 426 may be particularly thin for polymeric coatings of optical fibers, as discussed below, and the outer layer 430 may be substantially thinner than the inner layer 428, such as less than half the thickness thereof. In the embodiment shown in FIGS. 5-6, coating 426 is formed from material(s) that provide protection (e.g., protection from scratches, chips, etc.) to optical fibers 416.

The small thickness of coating 426 (i.e., the cross-sectional dimension of coating 426 shown in FIG. 6, which is perpendicular to exterior surface of the fiber 416, including inner layer 428 and outer layer 430) relative to the overall diameter of fibers 416 facilitates the fibers 416 being particularly densely packed within ribbon 410. In various embodiments, the thickness of coating 426, on average, is less than 50 μm (e.g., less than 50 micrometers or "microns"), specifically is less than 30 μm and more specifically is less than 20 μm. In a specific embodiment, the thickness of coating 426 is about 12.5 μm (e.g., 12.5 μm plus or minus 5 μm, 12.5 μm plus or minus 2.5 μm, 12.5 μm plus or minus 1 μm). In other embodiments, the coating 426 is thicker. The attributes and feature of the optical fibers 416 may also apply to the optical fibers 112 discussed above.

In various embodiments, the thickness of coating 426 is such that the percentage of the diameter of fibers 416 that results from coating 426 is particularly small. In various embodiments, the thickness of coating 426 accounts for less than 50% of the diameter of optical fiber 416, such as substantially less than 50%, and more-specifically less than 30% of the diameter of optical fiber 416, such as less than even 25% of the diameter of optical fiber 416. In a specific embodiment, coating 426 accounts to about 20% of the diameter of optical fiber 416. In certain embodiments, the diameter of center portion 420 of each optical fiber is about 100 μm, and the thickness of coating 426 is about 12.5 μm such that the resulting outer diameter of optical fiber 416 is about 125 μm. In other embodiments, the coating 426 is larger and/or the center portion 420 of the optical fiber is otherwise sized.

While some conventional optical fibers may include a hard polymer coating, the coating may be substantially thicker (e.g., at least five times thicker) than the coating 426 disclosed herein. For example, in some embodiments, coating 426 may not be designed to protect against standard levels of wear and tear that conventional optical fibers are made to withstand. Instead, the coating 426 may be far too thin to withstand such wear and tear. Coating 426 may simply be enough to protect the optical fiber 416 from abrasive contact and/or other wear with itself, such as when being handled by professional optical fiber technicians within the confines of a fiber optic assembly manufacturing facility. As such the thickness of the coating 426 may be counterintuitive to optical fiber manufacturers that design the optical fibers for more rugged usage because the coating layer 26 may provide such limited protection in some embodiments.

According to an exemplary embodiment, the particularly narrow sizing of coating layer 426 discussed herein facilitates dense packing of optical fibers 416 within ribbon body 412 of ribbon 410, substantially reducing both the overall size of the ribbon 410 and the amount of materials consumed thereby. For example, in various embodiments, the distance D1 between central axes of adjacent optical fibers of array 414 is less than 200 μm, specifically is less than 175 μm and more specifically is less than 150 μm. In a specific embodiment, D1 is about 125 μm. As will be understood, in embodiments in which each fiber 416 abuts and/or closely adjoins the adjacent fiber in the array, D1 (FIG. 6) is substantially equal to the average diameter of the adjacent fibers 416 plus a small margin, such as less than 10% of the average diameter.

Further, in the embodiment shown, in addition to the small thickness size of coating layer 426, the positioning of optical fibers with array 414 helps to provide for dense packing. For example, as shown the optical fibers 416 are embedded in ribbon matrix 412 such that the outer surface of each fiber 416, defined by outer surface 430 of each coating layer 426 in some embodiments, is in contact (e.g., actual contact between surfaces or in approximate contact, closely adjacent within manufacturing tolerances, such as less than 5 micrometers apart, etc.) with outer surface 430 of the adjacent fibers in the array. A edge bonding may be used to hold the fibers 416 together within the matrix of the ribbon 410, as discussed above.

In addition to spacing within ribbon matrix 412, sizing and positioning of optical fibers 416 facilitates the ribbon 410 having external dimensions that are substantially smaller than many conventional ribbons. As shown in FIG. 6, ribbon 410 has a width, W1, and a height, H1. In various embodiments, ribbon 410 includes four optical fibers 416 and W1 is between 500 μm and 700 μm, and H1 is between 150 μm and 300 μm. Other ribbons disclosed herein may be similarly sized.

In various embodiments, because of the relatively small thickness of coating 426, the percentage of the dimensions H1, W1 of ribbon 410 that result from the diameter of center portion 420 of fibers 416 (e.g., the diameter across or over the optical core 422 and cladding 424 only; glass portions of the optical fiber 416) is greater than many conventional ribbons. In various embodiments, the diameter of center portion 420 (e.g., glass portion) of each fiber 416 is greater than 50% of the height H1 of the ribbon, which provides for an exceptionally thin fiber optic ribbon. In some such embodiments, the diameter of the center portion 420 may be greater than 60% of H1 and more specifically is greater than 65% of H1. In some embodiments, the cumulative diameters of all center portions 420 (e.g., glass portions) of the fibers 416 contribute to between 50% and 95% of the width W1 of the ribbon, which also provides for an exceptionally narrow ribbon. In some such embodiments, the diameter of the center portion 420 may be between 60% and 90% of W1, where the percentage increases with number of fibers in the ribbon.

As noted above, matrix 414 of ribbon 410 is structured to provide stress-isolation and/or desired bend characteristics. In the embodiment shown, ribbon matrix 412 includes a first layer shown as inner layer 432 and an outer layer 434. Inner layer 432 is formed from a single continuous layer of polymeric material and includes at least one inner surface 436 that is in contact with outer layer 430 and/or exterior of optical fibers 416. In this arrangement, optical fibers 416 are embedded in and each fiber is at least partially surrounded by the material of inner layer 432. In one embodiment in which the outer surfaces of fibers 416 are in contact (e.g., actual contact between surfaces or in approximate contact) with each other, between 95% to 100% of the area of the exterior surfaces of fibers 416 within inner layer 432 contacts the material of inner layer 432. In one embodiment in which the outer surfaces of fibers 416 are in contact with each other, less than 100% but greater than 95% of the area of the outer surfaces of fibers 416 within inner layer 432 contacts the material of inner layer 432.

Still referring to FIGS. 5-6, outer layer 434 of the ribbon matrix 414 is a single contiguous layer of polymeric material that surrounds inner layer 432 thereof. Outer layer 434 includes an inner surface 438 and an outer surface 440. Outer surface 440 may define the exterior surface of ribbon 410. Inner surface 438 of outer layer 434 is in contact (e.g., actual contact between surfaces or in approximate contact) with an outer surface 442 of inner layer 432. In one such embodiment, more than 95% of inner surface 438 of outer layer 434 is in contact with the outer surface 442 of inner layer 432. In this manner, the interface between inner layer 432 and outer layer 434 of the matrix 414 defines a boundary 444. In the embodiment shown, boundary 444 has a generally rectangular cross-sectional shape with filleted corners. As shown in FIG. 1, the boundary 444 may be otherwise shaped. In this embodiment of FIGS. 5-6, the upper, lower, left and right sides of boundary 444 are generally planar sections such that outer layer 434 has a substantially consistent thickness along the upper, lower, right and left sides of ribbon matrix 412.

In various embodiments, one or more material properties of each of coating 426, inner layer 432 of the matrix 414, and outer layer 434 of the matrix 414 are selected to provide for various functionalities discussed herein. In general, both coating 426 and outer layer 434 are formed from relatively stiff materials (e.g., materials having a relatively high Young's modulus of elasticity), and inner layer 432 is formed from a relatively compliant material (e.g., a material having a relatively low Young's modulus of elasticity). In some embodiments, the high modulus material of coating 426 acts to protect the outer surface of the cladding layer 424 of fibers 416, and the high modulus material of outer layer 434 acts to provide strength and durability to ribbon 410. In such embodiments, the low modulus material of inner layer 432 provides a compliant layer that acts to isolate or insulate optical fibers 416 from stresses that may be applied to ribbon 410, and thus, helps to limit or prevent optical signal attenuation that may occur because of stress experienced by the optical core of fibers 416.

In various embodiments, the elasticity of the materials of the various layers are selected to provide the various functionalities discussed herein. In various embodiments, the Young's modulus of elasticity of the material of outer layer 434 and the Young's modulus of elasticity of the material(s) of coating 426 are greater than the Young's modulus of elasticity of the material of inner layer 432. In one embodiment, the Young's modulus of elasticity of the material of outer layer 434 is between 50-200 MPa, the Young's modulus of elasticity of the material of inner layer 432 is between 1-20 MPa, and the Young's modulus of elasticity of the material(s) of coating 426 is between 50-200 MPa. In one embodiment, the Young's modulus of elasticity of the material of both outer layer 434 and of coating 426 are at least 2 times and/or no more than 200 times greater than the Young's modulus of elasticity of the material of inner layer 32, such as between 5 and 100 times greater.

Figure 7:
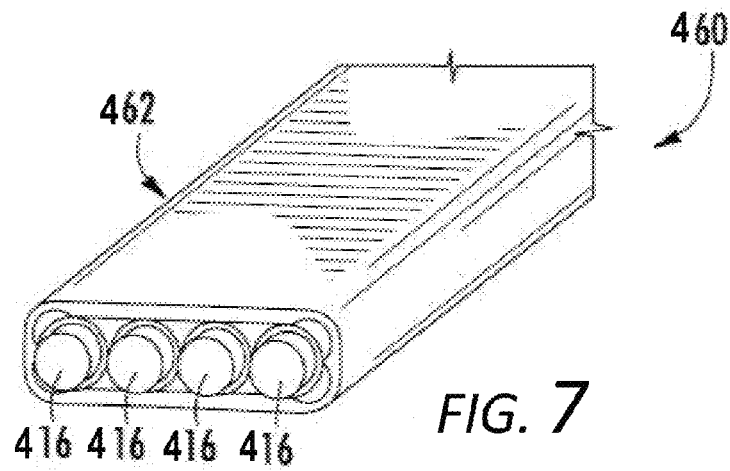
FIG. 7 is a perspective view of a fiber optic ribbon according to another exemplary embodiment.

Referring now to FIG. 7 and FIG. 8, another fiber optic ribbon, shown as fiber optic ribbon 460, is shown according to an exemplary embodiment. Ribbon 460 is substantially similar to ribbon 410 except as discussed herein. Ribbon 460 includes a ribbon body, shown as ribbon matrix 462. An optical fiber array including four optical fibers 416 are embedded in ribbon matrix 462. Similar to ribbon matrix 412 discussed above, ribbon matrix 462 includes an inner layer 464 and an outer layer 466. Inner layer 464 is formed from a single continuous (e.g., lengthwise continuous) layer of polymeric material and includes at least one inner surface 468 that is in contact with outer surfaces 430 of optical fibers 416. In this arrangement, optical fibers 416 are embedded in and surrounded by the material of inner layer 464. In various embodiments, inner layer 464 is formed from a low modulus material as discussed above, and outer layer 466 is formed from a high modulus material as discussed above.

As shown in FIG. 8, ribbon 460 has a width, W2, and a height, H2. In various embodiments, ribbon 460 includes four optical fibers 416, and W2 is between 500 μm and 600 μm and more specifically is about 550 μm. In this embodiment, H1 is between 150 μm and 200 μm and more specifically is about 180 μm. In other embodiments, the ribbon 460 has the dimensions H1 and W1 disclosed above with regard to embodiments associated with FIGS. 5-6.

According to an exemplary embodiment, outer layer 466 is a single contiguous layer of polymeric material that surrounds inner layer 464. Outer layer 466 includes an inner surface 470 and an outer surface 472. Outer surface 472 defines the exterior surface of ribbon 460. Inner surface 470 of outer layer 466 is in contact with an outer surface 474 of inner layer 464. In this manner, the interface between inner layer 464 and outer layer 466 defines a boundary 476.

In contrast to boundary 444 shown in FIGS. 5 and 6, boundary 476 has expanded or protruding rounded corner sections 478. Rounded corner sections 478 are formed from inner layer 464 having four expanded portions 480 located at the corners of inner layer 464. Expanded portions 480 are shaped such that the thickness of inner layer 464 measured in a direction perpendicular to outer surface 430 of fibers 416 increases along an arc swept over 45 degrees and decreases along an adjacent arc swept over 45 degrees to form expanded portions 80 at the corners of boundary 476. Further, because of the additional volume occupied by expanded portions 480, outer layer 466 includes corner sections 482 that have a thickness that is less than the thickness of outer layer 466 along the upper and lower portions of outer layer 466. Expanded portions 480 provide sections of variable thickness to inner layer 464 that act as alignment features to properly align and guide the ribbon through the stage of an extrusion or coating equipment that forms outer layer 466.

Referring to FIG. 8, boundary 476 includes a first substantially planar section 484 and a second substantially planar section 486 both extending parallel to a major axis of ribbon 460 (e.g., the horizontal axis in the orientation of FIG. 8) and are located above and below fibers 416, respectively. First substantially planar section 484 is substantially tangential to an upper portion of outer surfaces 430 of optical fibers 416, and second substantially planar section 486 is substantially tangential to a lower portion of outer surfaces of optical fibers 416.

As shown, first substantially planar section 484 and second substantially planar section 486 are substantially parallel to each other and are separated by a distance substantially equal to the cross-sectional diameters of optical fibers 416, such as less than 415 micrometers more than the diameter. Boundary 476 also includes a first lateral section 488 that contacts outer surface 430 of the left most fiber 416 of array 414 and a second lateral section 490 that contacts outer surface 430 of the right most fiber 416 of array 414. In one embodiment inner layer 464 is extruded over fibers 416, and in this embodiment, the formation of inner layer 464 having tangential planar sections 484 and 486 helps to ensure that fibers 416 remain in a parallel array during extrusion of inner layer 464, and formation of inner layer 464 having lateral sections 488 and 490 help to ensure the width of array 414 and help ensure accurate core to core spacing.

In one embodiment, boundary sections 484, 486, 488 and 490 result from an extrusion tool geometry that is in contact (e.g., actual contact between surfaces or in approximate contact) within the outer surfaces of fibers 416 at the positions of these boundary sections, and it is this contact (e.g., actual contact between surfaces or in approximate contact; lack of clearance between fibers 416 and the tool) that facilitates the spacing and positioning of fibers 416 as the fibers 416 move through the extrusion equipment that forms inner layer 464.

Figure 9:
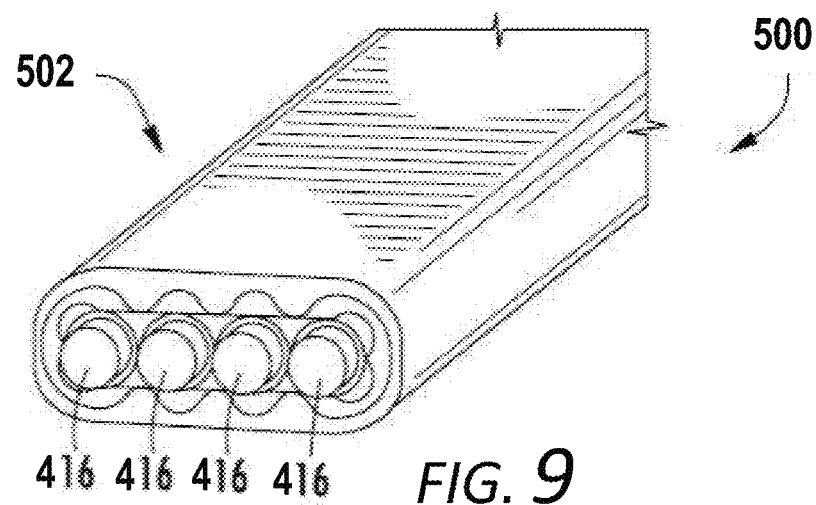
FIG. 9 is a perspective view of a fiber optic ribbon according to another exemplary embodiment.
Figure 10:
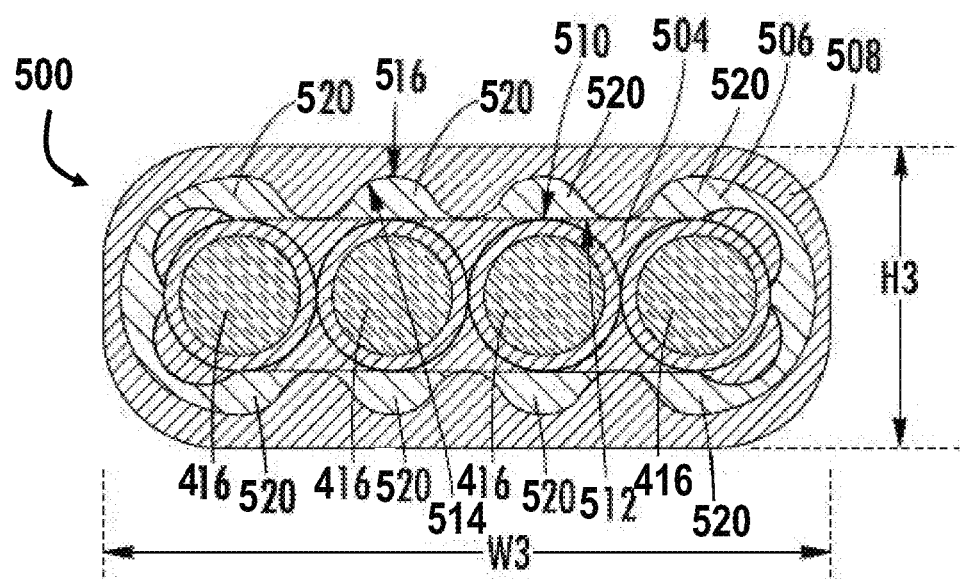
FIG. 10 is a cross-sectional view of the fiber optic ribbon of FIG. 9 according to an exemplary embodiment.

Referring to FIG. 9 and FIG. 10, another fiber optic ribbon, shown as fiber optic ribbon 500, is shown according to an exemplary embodiment. Ribbon 500 is substantially similar to ribbon 410 and ribbon 460 except as discussed herein. Ribbon 500 includes a ribbon body, shown as ribbon matrix 502. An optical fiber array including four optical fibers 416 are embedded in ribbon matrix 502. Ribbon matrix 502 includes an inner layer 504, a middle layer 506 and an outer layer 508.

In this embodiment, middle layer 506 has an inner surface 510 that contacts an outer surface 512 of inner layer 504, and middle layer 506 has an outer surface 514 that contacts an inner surface 516 of outer layer 508. In one embodiment, both inner layer 504 and outer layer 508 are formed from a high modulus material similar to outer layer 434 of ribbon 410 discussed above, and middle layer 506 is formed from a low modulus material similar to inner layer 432 of ribbon 410 discussed above. In some embodiments, the inner layer 504 may serve as edge bonding, and may have the edge bonding structure and materials described above (see, e.g., edge bonding 118 as shown in FIG. 1); and in other embodiments, inner layer 504 is formed from a moderate modulus material such that the material of inner layer 504 has a Young's modulus of elasticity that is between the modulus of middle layer 506 and the modulus of outer layer 508.

Inner layer 504 is a similar shape as inner layer 464 of ribbon 460 discussed above. As discussed above, the shape of inner layer 504 results in a boundary between its outer surface and the adjacent exterior layer that enforces the positioning of fibers 416 during movement through the extrusion tooling. Middle layer 506 is shaped having one or more portions of variable thickness, shown as protrusions 520. Protrusions 520 act similar to expanded portions 480 of ribbon 460 in that they act as alignment features to properly align and guide the ribbon through the stage of extrusion equipment that forms outer layer 508.

As shown in FIG. 10, ribbon 500 has a width, W3, and a height, H3. In various embodiments, ribbon 500 includes four optical fibers 416, and W3 is between 550 µm and 650 µm and more specifically is about 600 µm. In this embodiment, H1 is between 200 µm and 300 µm and more specifically is about 250 µm. In other embodiments, the ribbon 500 has the dimensions H1 and W1 (e.g., actual dimension, ratios, percentages, etc.) disclosed above with regard to embodiments associated with FIGS. 5-6 multiplied by a factor of between 1 to 2, such as 1.1 to 1.5.

In various embodiments, coating layer 426, inner layers 432, 464 and 504 and outer layers 434, 466 and 508 and middle layer 506 may be made from a wide variety of polymeric materials having the various moduli of elasticity as discussed above. In one embodiment, coating layer 426, inner layers 432, 464, and 504 and outer layers 434, 466, and 508 and middle layer 506 are formed from UV curable acrylate materials. In other embodiments, coating layer 426, inner layers 432, 464, and 504 and outer layers 434, 466, and 508 and middle layer 506 may be formed from thermoplastic and/or thermoset materials.

While embodiments discussed herein relate primarily to embodiments of a ribbon having four optical fibers, the stress isolating ribbon body and optical fibers discussed above can be used in other ribbon applications. In other exemplary embodiments, the optical ribbons discussed herein may include 2, 6, 8, 10, 12, 14, 16, etc. optical fibers or transmission elements (e.g., optical fibers 16). While the ribbon embodiments discussed herein are shown having fibers 416 arranged in a substantially parallel array, fibers 416 may be arranged in a square array, rectangular array, a staggered array, or any other spatial pattern that may be desirable for a particular application.

In another embodiment, the optical ribbons discussed herein may include one or more multi-core optical fibers located within ribbon matrix 412. In some contemplated embodiments, a single, integral optical structure having multiple optical transmission elements (e.g., multiple optical cores surrounded by cladding) may be provided, and the multi-core optical fiber is embedded in one of the stress-isolating ribbon matrix embodiments and/or coated with a coating layer (e.g., coating 426) as discussed herein.

The optical fibers discussed herein may be flexible, transparent optical fibers made of glass and/or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light and/or directs light in or toward the core through reflection (e.g., total internal reflection). The cladding may be coated by a polymeric buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical fibers may be bend insensitive, as discussed above, and/or may be single mode, multimode, and/or multicore fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A fiber optic ribbon, comprising:
   optical fibers, each optical fiber comprising a core surrounded by a cladding;
   edge bonding rigidly connecting the optical fibers to one another in a side-by-side arrangement;
   a stress-isolation layer surrounding the optical fibers and the edge bonding, wherein the edge bonding limits independent movement of the optical fibers relative to one another within the stress-isolation layer; and
   a hardened shell surrounding the optical fibers, the edge bonding, and the stress-isolation layer, the hardened shell defining an exterior of the fiber optic ribbon,
   wherein, at 25° Celsius and at sea level, the Young's modulus of elasticity of the hardened shell is, on average, at least twice that of the stress-isolation layer.

2. The fiber optic ribbon of claim 1, wherein the edge bonding is less than 10% of the fiber optic ribbon in terms of volume.

3. The fiber optic ribbon of claim 2, wherein the edge bonding is less than 6% of the fiber optic ribbon in terms of volume.

4. The fiber optic ribbon of claim 1, wherein the edge bonding circumferentially surrounds each of the optical fibers.

5. The fiber optic ribbon of claim 4, wherein the edge bonding is a continuous, single layer, tightly encompassing the optical fibers connected thereby such that the edge bonding extends no more than 50 micrometers, on average, from any given location of the edge bonding to the closest optical fiber of the optical fibers.

6. The fiber optic ribbon of claim 5, wherein the edge bonding extends no more than 20 micrometers, on average, from the closest optical fiber of the optical fibers connected thereby.

7. The fiber optic ribbon of claim 1, wherein the edge bonding is harder than the stress-isolation layer.

8. The fiber optic ribbon of claim 1, wherein, at 25° Celsius and at sea level, the Young's modulus of elasticity of the edge bonding is, on average, at least twice that of the stress-isolation layer, whereby the hardened shell mitigates damage to the stress-isolation layer from external sources of wear, the stress-isolation layer cushions the optical fibers relative to external sources of stress and provides at least some flexibility to the optical fibers within the hardened shell, and the edge bonding mitigates attenuation of the optical fibers associated with fiber-on-fiber loading internal to the stress-isolation layer.

9. The fiber optic ribbon of claim 5, wherein the stress-isolation layer is a continuous, single layer surrounding the edge bonding layer.

10. The fiber optic ribbon of claim 9, wherein each of the optical fibers includes a polymeric outer coating surrounding the cladding of each optical fiber, wherein the edge boding layer surrounds the polymeric outer coating of the optical fibers.

* * * * *